United States Patent [19]

Ito et al.

[11] Patent Number: 4,714,654

[45] Date of Patent: Dec. 22, 1987

[54] MAGNETIC RECORDING MEDIUM

[75] Inventors: Takeo Ito; Hajime Takeuchi, both of Yokohama; Minoru Hashimoto, Kawasaki; Tatsumi Maeda, Yokohama, all of Japan

[73] Assignee: Kabushiki Kaisha Toshiba, Japan

[21] Appl. No.: 683,582

[22] Filed: Dec. 19, 1984

[51] Int. Cl.$^4$ .................... C04B 35/26; G11B 5/68; G11B 5/70

[52] U.S. Cl. ..................... 428/328; 428/694; 428/900; 427/128

[58] Field of Search ............... 428/694, 328, 329, 900; 427/128

[56] References Cited

U.S. PATENT DOCUMENTS

| | | | |
|---|---|---|---|
| 4,341,648 | 7/1982 | Kubo et al. | 252/62.59 |
| 4,425,401 | 1/1984 | Ido et al. | 428/329 |
| 4,442,159 | 4/1984 | Dezawa et al. | 428/328 X |
| 4,455,345 | 6/1984 | Miyatuka et al. | 428/332 |
| 4,511,617 | 4/1985 | Hideyama et al. | 428/694 X |
| 4,540,627 | 9/1985 | Ishizawa et al. | 428/694 X |
| 4,584,242 | 4/1986 | Nagai et al. | 427/128 X |

FOREIGN PATENT DOCUMENTS

| | | |
|---|---|---|
| 0106577 | 4/1984 | European Pat. Off. . |
| 0116449 | 8/1984 | European Pat. Off. . |
| 0123445 | 10/1984 | European Pat. Off. . |
| 0137949 | 4/1985 | European Pat. Off. . |
| 0141558 | 5/1985 | European Pat. Off. . |
| 3342682 | 5/1984 | Fed. Rep. of Germany . |

Primary Examiner—Nancy A. Swisher
Attorney, Agent, or Firm—Schwartz, Jeffery, Schwaab, Mack, Blumenthal & Evans

[57] ABSTRACT

A magnetic recording medium in which a hexagonal crystalline system ferromagnetic powder having a specific surface area of 25 to 50 m$^2$/g is dispersed in a resinous binder is suitable for high-density recording which is low in noise and is excellent in orientation properties.

16 Claims, 1 Drawing Figure

MAGNETIC RECORDING MEDIUM

BACKGROUND OF THE INVENTION

This invention relates to a magnetic recording medium, more specifically to a magnetic recording medium for high-density recording which is low in noise and is excellent in orientation properties.

Heretofore, most of the magnetic recording media have each been prepared by applying a magnetic coating composition composed of a magnetic powder and a resinous binder on a support substrate such as a polyester film. As the magnetic powders, there have mainly been used needle ferromagnetic powders comprising $\gamma$-$Fe_2O_3$, $Fe_3O_4$, their cobalt adsorption systems and $CrO_2$. However, these needle ferromagnetic powders are small in their coercive force, and thus their recording density has already reached the limit. Therefore, these powders cannot satisfy recent requirements for high-density recording any more. For the purpose of overcoming this drawback, some attempts have been made to lessen a grain length of the needle ferromagnetic powder to the utmost or to improve a coercive force (Hc) and a maximum magnetic flux density (Ms). However, when the grain length of the needle ferromagnetic powder is reduced, electromagnetic conversion properties of the powder will be worsened in a low section by the influence of a reverse magnetic field, and thus a sufficient improvement in the needle ferromagnetic powder cannot be expected.

On the other hand, a so-called metallic tape is known in which the support substrate is coated with the magnetic coating composition prepared by dispersing the fine magnetic iron powder into the resinous binder. Although this metallic tape has the advantage that the magnetic recording can be carried out in a higher density than by the use of a conventional $\gamma$-$Fe_2O_3$ magnetic iron oxide material, it will easily be oxidized by oxygen in air, so that during the manufacturing process of the magnetic iron powder or the magnetic coating composition, the probability of a dangerous explosion will be extremely high, and its handling will be difficult. In addition thereto, such a metallic tape has the drawback that a stability which is one of the essential properties of the magnetic recording medium cannot be kept up for a long period of time.

As the magnetic powder by which the above-mentioned problems can be solved and the high-density recording can be accomplished, much attention is now paid to a hexagonal crystalline system ferromagnetic powder which is chemically stable and is suitable for a vertical magnetic recording. This vertical magnetic recording technique is essentially suitable for the high-density recording, since the higher the recording density becomes, the less the reverse magnetic field in the recording medium becomes.

The hexagonal crystalline system ferromagnetic powder generally comprises hexagonal plate-like grains and has magnetization-easy axis extending vertically to the plate surfaces of the grains. For this reason, even when coating is only made with these magnetic grains, the surfaces of the grains can easily be arranged in parallel with the support, therefore the magnetization-easy axis can be vertically oriented without any difficulty by means of a magnetic field orientation treatment or a mechanical orientation threatment. Hence, if the hexagonal crystalline system ferromagnetic powder having such properties is uniformly applied, as a fine single domain structure powder (average grain diameter 0.2 $\mu$m or less), on the surface of the support together with the resinous binder, it will be expected to prepare the magnetic recording medium having an extremely high recording density.

However, when the average grain diameter of the hexagonal crystalline system ferromagnetic powder is 0.2 $\mu$m or less, a cohesive force between the grains will be great, and it will thus be difficult to sufficiently disperse such a powder into the magnetic coating composition. As a result, the obtained magnetic recording medium will be poor in vertical orientation, will not be so good as expected at first in point of reproduction output properties, and will be poor in noise reduction properties.

Also when the average grain diameter of the magnetic powder is 0.2 $\mu$m or more, such problems as mentioned above are likewise raised, though its dispersion properties can be improved a little.

Accordingly, it has been desired to improve the dispersion properties of the hexagonal crystalline system ferromagnetic powder and to build up, by the use of the improved ferromagnetic powder, the orientation properties and the noise reduction properties of the magnetic recording medium.

SUMMARY OF THE INVENTION

An object of this invention is to provide a magnetic recording medium for high-density recording which is low in noise and is excellent in orientation properties.

The present inventors has conducted intensive researches to accomplish the above-mentioned object, and as a result, they have found that in a haxagonal crystalline system ferromagnetic powder, there is not always an inverse proportional relation between a grain diameter and a magnitude of a specific surface area within the average grain diameter range of 0.02 to 0.2 $\mu$m, and the dispersion properties do not directly depend on the grain diameter but are closely connected with the magnitude of the specific surface area, and accomplished the present invention.

That is, a magnetic recording medium of this invention is characterized in that a hexagonal crystalline system ferromagnetic powder having a specific surface area of 25 to 50 m²/g is dispersed in a resinous binder.

BRIEF DESCRIPTION OF THE DRAWING

A drawing is an illustrative diagram showing relations between specific surface areas of magnetic powders and reproduction output of magnetic recording media regarding this invention.

DESCRIPTION OF PREFERRED EMBODIMENT

Figure 1:
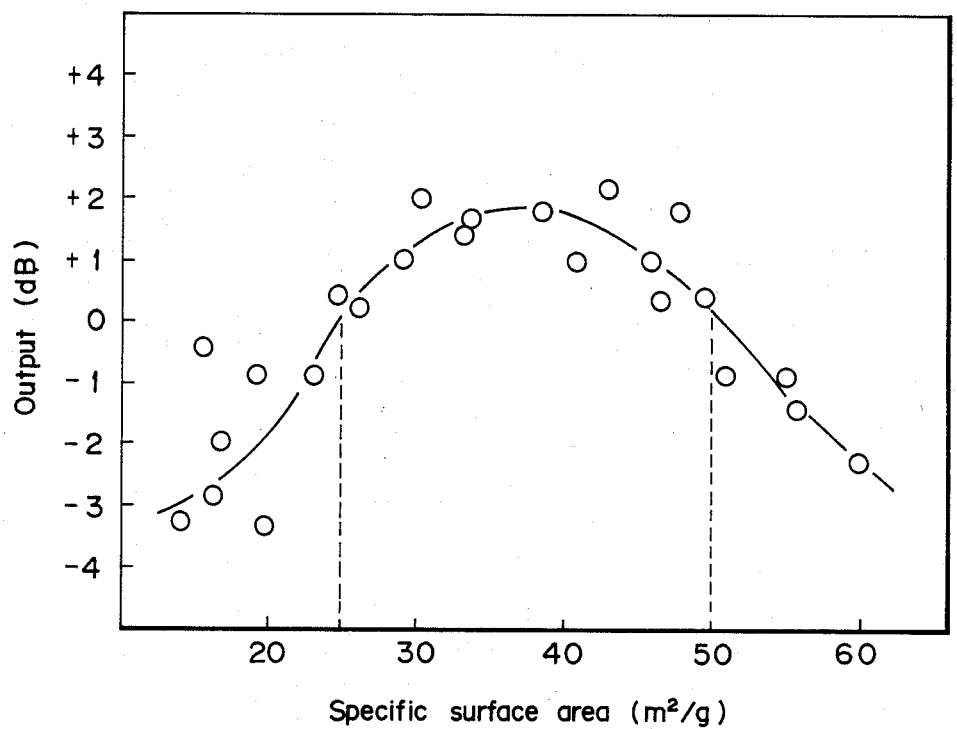

The magnetic recording medium according to the present invention will be described more detail in the following.

The usable hexagonal crystalline system ferromagnetic powder include a fine metallic grain which is capable of forming by itself a hexagonal crystalline system such as Co, Co-Cr, Co-Mn and Mn-Al, and a hexagonal crystalline system ferrite represented by the general formula:

$$MO \cdot n(Fe_2O_3)$$

M is any one of Ba, Sr, Pb and Ca; n is a number of 5 to 6; and a portion of Fe may be replaced with a transition metal such as Ti, Co, Zn, In, Mn, Cu, Ge or Nb.

The hexagonal crystalline system ferrites are preferable and Ba-ferrite is more preferable.

Since the hexagonal crystalline system ferrite generally has a high coercive force, the preferred magnetic powders used in this invention are materials in which a portion of the constitutional atoms is replaced with a specified atom in order to decrease the coercive force up to a range suitable for vertical magnetic recording.

The coersive force of the magnetic powder is preferably within the range of 200 to 2000 Oe, more preferably of 300 to 1500 Oe. When the coercive force is less than 200 Oe, it will be hard to enhance the recording density; when it is more than 2000 Oe, magnetic recording media will not sufficiently be magnetized.

The specific surface area of the hexagonal crystalline system ferromagnetic powder is adjusted to the range of 25 to 50 m$^2$/g, preferably 30 to 40 m$^2$/g. The term "specific surface area" referred here means a surface area of the powder per unit weight which has been measured by a BET adsorption method in a nitrogen gas. The reason why the specific surface area is adjusted to the range of 25 to 50 m$^2$/g is that an adsorption force of a binder such as a resin to the surfaces of the magnetic grains overcomes a cohesive force between the magnetic grains within such a range in order to permit dispersing uniformly the magnetic powder into the magnetic coating composition or the coating film, so that the fluidity of the coating composition can be improved and the smooth surface of the coating film can thus be formed. As a result, the orientation properties of the magnetic recording medium will be heightened, and reproduction output properties as well as noise reduction properties will thus be built up. In other words, when the specific surface area is less than 25 m$^2$/g, the adsorption of the binder will be insufficient, and the cohesive force of the magnetic powder will defeat the adsorption force of the binder. On the contrary, when the specific surface area is more than 50 m$^2$/g, a surface energy of the magnetic powder will increase and the cohesive force of the magnetic powder will thus enhance. Thus, the cohesive force of the magnetic powder will also overcome the adsorption force of the binder, with the result that the dispersibility of the magnetic powder will deteriorate. In consequence, it causes the deterioration of the reproduction output and noise properties of the recording media.

Further, the grain diameter of the hexagonal crystalline system ferromagnetic powder is preferably within the range of 0.02 to 0.2 μm, more preferably of 0.03 to 0.10 μm. When the average grain diameter is less than 0.02 μm, the thickness of the non-magnetic layers constituting the surfaces of the magnetic grains cannot be neglected, and a maximum magnetic flux density (Ms) of the magnetic powder will begin to deteriorate and the orientation properties will get poor, so that it will be difficult to carry out the high-density recording. On the other hand, when the average grain diameter is more than 0.2 μm, the magnetic cohesive force of the magnetic powder will heighten and noise will thus increase, so that the high-density recording will be hard to accomplish, similarly to the above case, though the orientation properties will be improved.

Such a hexagonal crystalline system ferromagnetic powder may be prepared in accordance with, for example, a glass crystallization method described in the specifications of Japanese Unexamined Patent Publication Nos. 67904/1981 (or U.S. Pat. No. 4,341,648) and 134522/1981 pertaining to the applicant of this application. According to the above described method, the specific surface area and the grain diameter of the magnetic powder can be extensively regulated by varying suitably reaction conditions at the time of manufacturing. Therefore, the above-mentioned specific surface area and grain diameter can be selected from a wide range.

As the usable resinous binder, any flexible film-forming material is acceptable, so long as it has a good affinity for the support material and the magnetic powder. Examples of the resinous binders include known materials such as vinyl chloride-vinyl acetate type copolymers, NBR-poly(vinyl acetate) type polymers, urethane plasticized vinyl chloride-vinyl acetate type copolymers, polyurethane resins, polyester resins and polyisocyanate compounds.

The magnetic recording medium of this invention is usually applied on a support substrate excellent in mechanical properties such as flexibility, tensile strength and dimensional stability, for example, a polyester film. By such an application of the medium on the support, handling of the magnetic recording medium is extremely facilitated.

The magnetic recording medium of this invention can be prepared, for example, as follows: First of all, predetermined amounts of the hexagonal ctystalline system ferromagnetic powder, the resinous binder and a suitable solvent such as methyl ethyl ketone, toluene and the like are placed in a dispersing/mixing machine such as a sand grinder pot, and the mixing machine is then driven to prepare the magnetic coating composition.

In this case, the blending proportion of the binder to the hexagonal crystalline system ferromagnetic powder is usually adjusted to the range of 10 to 40 parts by weight of the binder based on 100 parts by weight of the hexagonal crystalline system ferromagnetic powder, preferably of 12 to 30 parts by weight of the binder based on 100 parts by weight of the hexagonal crystalline system ferromagnetic powder. The magnetic coating composition may additionally contain known additives, for example, an antistatic agent such as carbon black, a dispersant such as lecithin, a lubricant, an abrasive and a stabilizer.

In the next step, the prepared magnetic coating composition is applied on the support substrate according to a known manner by the use of a reverse-roll coater, a doctor blade coater, a gravure coater or the like, and drying and smoothing treatments are then carried out preferably while orientation is made vertically to the surface of the support substrate by a magnetic field orientation or a mechanical orientation treatment, thereby obtaining the magnetic recording medium of the present invention. In this case, the orientation of the magnetic powder can be carried out by any one of methods and equipments described, for example, in the specifications of Japanese Unexamined Patent Publication Nos. 163633/1980, 58247/1982 and 58246/1982 pertaining to the applicant of this case.

As is definite from the aforementioned description, the magnetic recording medium of this invention has the following functional effects: (1) since the hexagonal crystalline system ferromagnetic powder is used, the magnetization-easy axis of the magnetic layer is easy to vertically orient; (2) its specific surface area is within the range of 25 to 50 m$^2$/g, therefore the dispersion properties are good, and it follows that the smoothness, orientation rate and noise reduction properties are excellent; and (3) in consequence, the high-density recording can be accomplished. Accordingly, it is sure that the magnetic recording medium of this invention is greatly valuable from the industrial viewpoint.

A magnetic recording medium of this invention will be described in detail in accordance with examples.

EXAMPLE 1

Five parts by weight of conductive carbon black, 4 parts by weight of lecithin, 60 parts by weight of methyl ethyl ketone, 40 parts by weight of toluene were added to 60 parts by weight of a substituted barium ferrite $BaO.6\{(Fe_{0.86}Co_{0.07}Ti_{0.07})_2O_3\}$ powder, as a hexagonal crystalline system ferrite powder, having an average grain diameter of 0.09 $\mu$m, a specific surface area of 27 $m^2/g$, a coercive force of 780 Oe, a maximum magnetic flux density of 59 emu/g. After sufficient mixing, 10 parts by weight of a vinyl chloride-vinyl acetate copolymer (tradename VAGH; produced by Union Carbide Inc.) and 10 parts by weight of a polyurethane resin (tradename N-2301; produced by Nippon Polyurethane Industry Co., Ltd.) were further added thereto, and they were subjected to a dispersion treatment in a sand grinder pot for about 2 hours. The resulting magnetic coating composition was filtered, and a polyisocyanate hardener (trade name Colonate L; produced by Nippon Polyurethane Industry Co., Ltd.) was then added thereto. Afterward, the magnetic coating composition was applied on a polyester film by means of a reverse-roll coater, and drying was carried out by causing the coated film to pass through a vertical magnetic field, thereby preparing a magnetic layer a coating film thickness of which was about 2 $\mu$m. Finally, the magnetic layer was passed through a supercalender roll in order to carry out a smoothing treatment, so that a magnetic recording medium of this invention was prepared.

A surface roughness, a vertical orientation rate and a reproduction output (4 MHz carrier; tape speed 3.5 m/sec) of the magnetic layer were measured for this magnetic recording medium. The results are set forth in Table 1 given hereinafter.

The value of the reproduction output was a relative value obtained by employing, as a standard, a metallic tape (0 dB) measured in such a manner as mentioned above by the use of a ferromagnetic metallic powder, as the magnetic powder, having an average grain diameter of 0.27 $\mu$m, a specific surface area of 36 $m^2/g$, a coercive force of 1270 Oe and a maximum magnetic flux density of 170 emu/g.

It is apparent from Table 1 that the magnetic recording medium of this invention had a smooth coating film surface, a high vertical orientation rate and an excellent reproduction output.

EXAMPLE 2

The procedure of Example 1 was repeated with the exception that the hexagonal system ferrite used in Example 1 was replaced with a substituted barium ferrite $BaO.6\{(Fe_{0.86}Co_{0.07}Ti_{0.07})_2O_3\}$ powder having an average grain diameter of 0.17 $\mu$m, a specific surface area of 35 $m^2/g$, a coersive force of 740 Oe and a maximum magnetic flux density of 60 emu/g in order to prepare a magnetic recording medium of this invention. Then, a surface roughness, a vertical orientation rate and a reproduction output of the magnetic layer were measured. The results are also set forth in Table 1.

As is apparent from Table 1, the magnetic recording medium of this invention had a smooth coating film surface, a high vertical orientation and an excellent reproduction output.

EXAMPLE 3

The procedure of Example 1 was repeated with the exception that the hexagonal crystalline system ferrite used in Example 1 was replaced with a substituted barium ferrite $BaO.6\{(Fe_{0.86}Co_{0.07}Ti_{0.07})_2O_3\}$ powder having an average grain diameter of 0.20 $\mu$m, a specific surface area of 33 $m^2/g$, a coersive force of 830 Oe, a maximum magnetic flux density of 61 emu/g in order to prepare a magnetic recording medium of this invention. Then, a surface roughness, a vertical orientation rate and a reproduction output of the magnetic layer were measured. The results are also set forth in Table 1.

As is apparent from Table 1, that the magnetic recording medium of this invention had a smooth coating film surface, a relatively high vertical orientation rate and an excellent reproduction output.

COMPARATIVE EXAMPLE 1

The procedure of Example 1 was repeated with the exception that the hexagonal crystalline system ferrite used in Example 1 was replaced with a substituted barium ferrite powder having about the same chemical composition as in Example 1 and having an average grain diameter of 0.08 $\mu$m, a specific surface area of 19 $m^2/g$, a coercive force of 810 Oe, a maximum magnetic flux density of 60 emu/g in order to prepare a magnetic recording medium. Then, a surface roughness, a vertical orientation rate and a reproduction output of the magnetic layer were measured. The results are also set forth in Table 1.

Comparing these results with those of the preceding examples, it will be definite that all properties of a smoothness on the coating film surface, a vertical orientation rate and a reproduction output were inferior to those of the above-mentioned magnetic recording media of this invention.

COMPARATIVE EXAMPLE 2

The procedure of Example 1 was repeated with the exception that the hexagonal crystalline system ferrite used in Example 1 was replaced with a substituted barium ferrite powder having about the same chemical composition as in Example 1 and having an average grain diameter of 0.24 $\mu$m, a specific surface area of 22 $m^2/g$, a coercive force of 780 Oe and a maximum magnetic flux density of 61 emu/g in order to prepare a magnetic recording medium.

Then, a surface roughness, a vertical orientation rate and a reproduction output of the magnetic layer were measured. The results are also set forth in Table 1.

Comparing these results with those of the preceding examples, it will be definite that all properties of a smoothness on the coating film surface and a reproduction output were inferior to those of the above-mentioned magnetic recording media of this invention.

COMPARATIVE EXAMPLE 3

The procedure of Example 1 was repeated with the exception that the hexagonal crystalline system ferrite used in Example 1 was replaced with a substituted barium ferrite powder having about the same chemical composition as in Example 1 and having an average grain diameter of 0.05 $\mu$m, a specific surface area of 63

$m^2/g$, a coercive force of 760 Oe and a maximum magnetic flux density of 49 emu/g in order to prepare a magnetic recording medium. Then, a surface roughness, a vertical orientation rate and a reproduction output of the magnetic layer were measured. The results are also set forth in Table 1.

Comparing these results with those of the preceding examples, it will be definite that all properties of a smoothness on the coating film surface, a vertical orientation rate and reproduction output were inferior to those of the above-mentioned magnetic recording media of this invention.

TABLE 1

| | Magnetic powder | | | | |
| --- | --- | --- | --- | --- | --- |
| | Average grain diameter (μm) | Specific surface area ($m^2/g$) | Surface roughness (μm) | Vertical orientation (%) | Output (dB) |
| Example 1 | 0.09 | 27 | <0.03 | 84 | +1.2 |
| Example 2 | 0.17 | 35 | <0.03 | 91 | +2.4 |
| Example 3 | 0.20 | 33 | 0.05 | 79 | +1.6 |
| Comparative Example 1 | 0.08 | 19 | 0.06 | 74 | −1.7 |
| Comparative Example 2 | 0.24 | 22 | 0.13 | 82 | −0.4 |
| Comparative Example 3 | 0.05 | 63 | 0.07 | 64 | −2.8 |

*A relative value obtained by employing a metal particulate tape as a standard (0 dB)

EXAMPLES 4 TO 16 AND COMPARATIVE EXAMPLES 4 TO 14

The procedure of Example 1 was repeated with the exception that the hexagonal crystalline system ferrite used in Example 1 was replaced with varieties of substituted barium ferrite powders having about the same chemical composition as in Example 1 and having average grain diameters of 0.03 to 0.12 μm and specific surface areas of 14 to 60 $m^2/g$ in order to prepare magnetic recording media.

EXPERIMENTAL EXAMPLES

Values of a reproduction output (4 MHz carrier; tape speed 3.75 m/sec) were measured for these magnetic recording media, and relations between these values and the specific surface areas of the magnetic powders were calculated. The results are shown in FIG. 1.

As understood from FIG. 1, the magnetic powders having specific surface areas of 25 to 50 $m^2/g$ exhibited excellent reproduction output. On the contrary, it can be understood that the reproduction output deteriorated when magnetic powders having specific surface areas of out of the above range were used.

In the drawing, the reproduction output on the ordinate axis are represented by relative values obtained by employing the reproduction output (0 dB) of the metal particulate tape as a standard, as mentioned above.

We claim:

1. A magnetic recording medium comprising a hexagonal crystalline system ferromagnetic powder having a specific surface area of 25 to 50 $m^2/g$ and an average grain diameter in the range of 0.02 to 0.2 μm, said powder being dispersed in a resinous binder, wherein said binder is present with said ferromagnetic powder in a blending proportion that is adjusted to the range of 10 to 40 parts by weight of the binder based on 100 parts by weight of the ferromagnetic powder.

2. The magnetic recording medium according to claim 1 wherein the hexagonal crystalline system ferromagnetic powder has a specific surface area of 30 to 40 $m^2/g$.

3. The magnetic recording medium according to claim 2, wherein the average grain diameter of the hexagonal crystalline system ferromagnetic powder is within the range of 0.03 to 0.10 μm.

4. The magnetic recording medium according to claim 1, wherein the hexagonal crystalline system ferromagnetic powder is a fine metallic grain capable of forming a hexagonal crystalline system by itself or a hexagonal crystalline ferrite represented by the general formula:

$$MO.n(Fe_2O_3)$$

M is any one of Ba, Sr, Pb and Ca; n a number of 5 to 6; and a portion of Fe may be replaced with a transition metal of Ti, Co, Zn, In, Mn, Cu, Ge and Nb.

5. The magnetic recording medium according to claim 4, wherein the fine metallic grain is Co, Co-Cr, Co-Mn and Mn-Al.

6. The magnetic recording medium according to claim 4, wherein the hexagonal crystalline system ferromagnetic powder is a hexagonal crystalline ferrite.

7. The magnetic recording medium according to claim 6, wherein the hexagonal crystalline ferrite is Ba-ferrite.

8. The magnetic recording medium according to claim 1, wherein a coercive force of the hexagonal crystalline system ferromagnetic powder is within the range of 200 to 2000 Oe.

9. The magnetic recording medium according to claim 8, wherein the coercive force of the hexagonal crystalline system ferromagnetic powder is within the range of 300 to 1500 Oe.

10. The magnetic recording medium according to claim 1, wherein the magnetic recording medium is applied on a support and magnetization-easy axes are oriented vertically to the surface of said support.

11. The magnetic recording medium according to claim 1, wherein the blending proportion of the binder to the hexagonal crystalline system ferromagnetic powder is within the range of 12 to 30 parts by weight.

12. A magnetic recording medium according to claim 1, wherein said powder component consists essentially of said ferromagnetic powder.

13. A magnetic recording medium according to claim 12, wherein said powder component consists of said ferromagnetic powder.

14. A magnetic recording medium according to claim 1, wherein said powder component has a maximum magnetic flux density value in the range of about 59 and 61 emu/g.

15. A magnetic recording medium according to claim 12, wherein said powder component has a maximum magnetic flux density value in the range of about 59 and 61 emu/g.

16. A magnetic recording medium according to claim 13, wherein said powder component has a maximum magnetic flux density value in the range of about 59 and 61 emu/g.

* * * * *